US008824424B2

(12) United States Patent
Hole et al.

(10) Patent No.: US 8,824,424 B2
(45) Date of Patent: Sep. 2, 2014

(54) SYSTEM AND METHOD FOR ADJUSTING MONITORING OF TIMESLOTS DURING DATA TRANSMISSION

(75) Inventors: David Philip Hole, Southampton (GB); Werner Kreuzer, Baiern (DE); Johanna Lisa Dwyer, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 615 days.

(21) Appl. No.: 12/763,895

(22) Filed: Apr. 20, 2010

(65) Prior Publication Data

US 2010/0322203 A1 Dec. 23, 2010

Related U.S. Application Data

(60) Provisional application No. 61/171,425, filed on Apr. 21, 2009.

(51) Int. Cl.
*H04J 3/00* (2006.01)
*H04W 72/12* (2009.01)
*H04W 52/02* (2009.01)

(52) U.S. Cl.
CPC ...... *H04W 72/1257* (2013.01); *H04W 52/0229* (2013.01)
USPC ........................................................ 370/336

(58) Field of Classification Search
CPC . H04W 72/04; H04W 72/0446; H04W 28/26; H04W 16/10
USPC ......... 370/241, 252, 310, 315, 316, 319, 321, 370/322, 328, 329, 336, 431, 442, 443, 464, 370/478; 455/403, 422.1, 450, 452.1
See application file for complete search history.

(56) References Cited

U.S. PATENT DOCUMENTS 7,289,504 B1 * 10/2007 Hippelainen et al. ......... 370/392
2007/0104135 A1 5/2007 Pecen et al.
(Continued)

FOREIGN PATENT DOCUMENTS

WO WO2007112762 A1 10/2007
WO WO2008030896 A2 3/2008
(Continued)

OTHER PUBLICATIONS

Nokia Corporation, Nokia Siemens Networks, Dynamic Timeslot Reduction, 3GPP TSG GERAN#41, Tdoc G2-090266, Valetta, Malta, Feb. 16-20, 2009.

(Continued)

*Primary Examiner* — Obaidul Huq
(74) *Attorney, Agent, or Firm* — Quarles & Brady LLP

(57) ABSTRACT

A method for coordinating communications between a user equipment and a base station is presented. The method includes receiving an assignment of a first set of timeslots for at least one of uplink and downlink communications between the user equipment and the base station. The method also includes transmitting to the base station an instruction to delay a reduction of a number of timeslots monitored by the user equipment to less than the first set of timeslots for communications. In some implementations, the instruction comprises at least one of a predetermined communication and a block including at least one of a dummy block format and a specified block format. The method may include transmitting a control block to the base station, the control block identifying one or more timeslots being monitored by the user equipment.

8 Claims, 15 Drawing Sheets

(56) References Cited

U.S. PATENT DOCUMENTS

| | | |
|---|---|---|
| 2008/0165727 A1* | 7/2008 | Xiaoben et al. ............... 370/329 |
| 2008/0233992 A1* | 9/2008 | Oteri et al. .................... 455/522 |
| 2010/0210275 A1* | 8/2010 | Navratil et al. ............... 455/450 |

FOREIGN PATENT DOCUMENTS

| | | |
|---|---|---|
| WO | WO2008095748 A1 | 8/2008 |
| WO | WO2009026739 A1 | 3/2009 |

OTHER PUBLICATIONS

PCT International Search Report and Written Opinion, PCT/GB2010/000810, Jul. 9, 2010.

3rd Generation Partnership Project, General Packet Radio Service (GPRS); Mobile Station (MS)—Base Station System (BSS) interface; Radio Link Control/Medium Access Control (RLC/MAC) protocol (Release 6), 3GPP TS 44.060 V6.10.0, Nov. 1, 2004, pp. 23-25, 92-93, 123, 286-291, 331.

PCT International Preliminary Report on Patentability, PCT/GB2010/000810, Oct. 25, 2011.

* cited by examiner

SYSTEM AND METHOD FOR ADJUSTING MONITORING OF TIMESLOTS DURING DATA TRANSMISSION

CROSS-REFERENCE TO RELATED APPLICATIONS

This application claims priority to and incorporates by reference U.S. Provisional Patent Application No. 61/171,425 which has the same title and was filed on Apr. 21, 2009.

BACKGROUND

The present disclosure relates generally to data transmission protocols in mobile communication systems and, more specifically, to systems and methods for reduced timeslot monitoring during data transmission.

As used herein, the terms "mobile station" (MS), "user agent," and "user equipment" (UE) can refer to electronic devices such as mobile telephones, personal digital assistants, handheld or laptop computers, and similar devices that have network communications capabilities. In some configurations, UE may refer to a mobile, wireless device. Such UEs that are mobile, wireless devices may or may not include a subscriber identity module (SIM) card. The terms may also refer to devices that have similar capabilities but that are not readily transportable, such as desktop computers, set-top boxes, or network nodes.

A UE may operate in a wireless communication network that provides for high-speed data communications. For example, the UE may operate in accordance with Global System for Mobile Communications (GSM) and General Packet Radio Service (GPRS) technologies. Today, such a UE may further operate in accordance with Enhanced Data rates for GSM Evolution (EDGE), or Enhanced GPRS (EGPRS) or Enhanced GPRS Phase 2 (EGPRS2).

EDGE/EGPRS/EGPRS2 are examples of digital mobile communications technology that allows for increased data transmission rate and improved data transmission reliability. It is often classified as a 2.75G network technology. EDGE has been introduced into GSM networks around the world since approximately 2003, initially in North America. EDGE/EGPRS/EGPRS2 may be used in any packet-switched application, such as those involving an internet connection. High-speed data applications, such as video and other multimedia services, benefit from EGPRS' increased data capacity.

A UE operating in accordance with EGPRS/EGPRS2 may have multi-slot capability that enables them to use between one (1) and eight (8) time slots for data transfer. More timeslots may be used if a downlink dual carrier configuration is supported. Since uplink and downlink channels are reserved separately, various multi-slot resource configurations may be assigned in different directions. UEs may be categorized into two types based on the multi-slot class that it supports. For example, (1) Multi-slot Classes 1-12, 19-45 (Type 1) UEs have multi-slot capability in the uplink (UL) and downlink (DL) directions and may use this capability quasi-simultaneously (for example, by transmitting or receiving within the same time division multiple access (TDMA) frame). This group of multi-slot classes may use half duplex communication. The reason for this limitation may be explained by selecting, for example, multi-slot class 26. In this case, the maximum allowable number of timeslots in the UL is 4 and in the DL it is 8. Simultaneous transmission and reception of this number of timeslots is possible only if the UE is capable of transmitting and receiving at the same time. This particular group, however, does not have such capability and the specification limits their operation to half-duplex. However, (2) Multi-slot Class 13-18 (Type 2) UEs are the most advanced group of UE and have the capability to simultaneously transmit and receive (full duplex communication), requiring splitters, duplexers, and filters to separate transmit and receive paths.

Regardless of the particular type of UE, during operation, the UE is assigned timeslots during which the UE can communicate with the base station. An assignment contains a set of timeslots on one (or, for downlink dual carrier, two) channel(s). In the case of an uplink assignment this is the total set of timeslots that may be used by the UE for uplink transmissions; in the case of a downlink assignment, this is the total set of timeslots on which the network may send data to the UE. For any given radio block period, the network dynamically allocates resources and determines on which downlink timeslots or uplink timeslots the UE may receive and/or transmit data. In basic transmission time intervals (BTTI), a given radio block period includes 4 TDMA frames and each TDMA frame includes 8 timeslots. The allocation algorithm is implementation dependent, but may take account of the UE's multislot class (the maximum number of timeslots on which it can transmit/receive, and the time required to switch from transmit to receive and vice versa), and will usually take account of the amount of data the base station controller (BSC) expects the UE to receive/transmit.

Reduced transmission time intervals (RTTI) can be used and is a modification to the above structure where, instead of a radio block being transmitted as four bursts with each block sent in a particular timeslot over four TDMA frames, a radio block (containing essentially the same amount of information) is transmitted using two timeslots in two TDMA frames. This reduces the transmission time for a block and reduces the overall latency of the system. Accordingly, a "reduced radio block period" is 2 TDMA frames (approx. 10 ms) compared with a basic radio block period, which is 4 TDMA frames (approx. 20 ms).

Uplink allocations are signaled by the use of an uplink state flag (USF), which is a number between 0 and 7 (inclusive), and is signaled in every downlink radio block. As part of its uplink assignment, the UE is informed which USF(s) on which timeslot(s) indicate an uplink allocation for that UE. USFs are generally included in the headers of downlink blocks. In the case of RTTI, USFs may be coded across radio blocks across four TDMA frames, for example in the same manner as downlink BTTI radio blocks are sent ("BTTI USF mode") or (using two timeslots) across two TDMA frames ("RTTI USF mode").

In some communication standards, there are "m" timeslots assigned for reception and "n" timeslots assigned for transmission. Thus, for a multislot class type 1 UE, there may be Min(m,n,2) reception and transmission timeslots with the same timeslot number. For a multislot class type 2 UE, there may be Min(m,n) reception and transmission timeslots with the same timeslot number. In the case of downlink dual carrier configurations, if timeslots with the same timeslot number are assigned on both channels, in calculating the value of m they may be counted as one timeslot. As a result, where both downlink and uplink timeslots are assigned, if assigned a single timeslot in one direction and one or more timeslots in the opposite direction, the timeslot number of the first timeslot may be the same as one of the timeslot(s) in the opposite direction. Similarly, if assigned two or more uplink timeslots and two or more downlink timeslots, at least two of the uplink and downlink timeslots may have a common timeslot number. As a result, in uplink+downlink assignments, the timeslots that may be monitored for USFs and downlink data blocks are largely co-incident. In this implementation, assignments and allocations are essentially under the control of the network (for example, the BSC).

Depending upon the system, Extended Dynamic Allocation (EDA) may provide a mechanism to allow multiple uplink blocks to be allocated to a UE by means of a single USF indication. When this protocol is utilized for a temporary block flow (TBF), if a UE detects a USF allocating it an uplink block, it is also implicitly allocated uplink blocks sent in the same radio block period using all timeslots which are part of its assignment and which are numbered higher than that on which the USF was received.

During an ongoing packet data session in GPRS, a UE with an assigned downlink TBF is required to monitor all downlink timeslots in its assignment in case the network sends it data during those timeslots. Similarly, if a UE has an assigned uplink TBF, it is required to monitor all timeslots on which the uplink state flag (USF) could be sent to dynamically allocate uplink resources. If a UE has both uplink and downlink TBFs, the UE may monitor as many relevant downlink timeslots as possible, taking into account any uplink transmissions. The constant monitoring of assigned timeslots requires the expenditure of significant amounts of wasted energy in the case that either the network or the UE has nothing to send. This is particularly so when neither the network nor the UE has data to send. Although it is possible to release the assigned resources, this may lead to a user-perceived delay when further data is to be sent, since the resources may be re-established.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
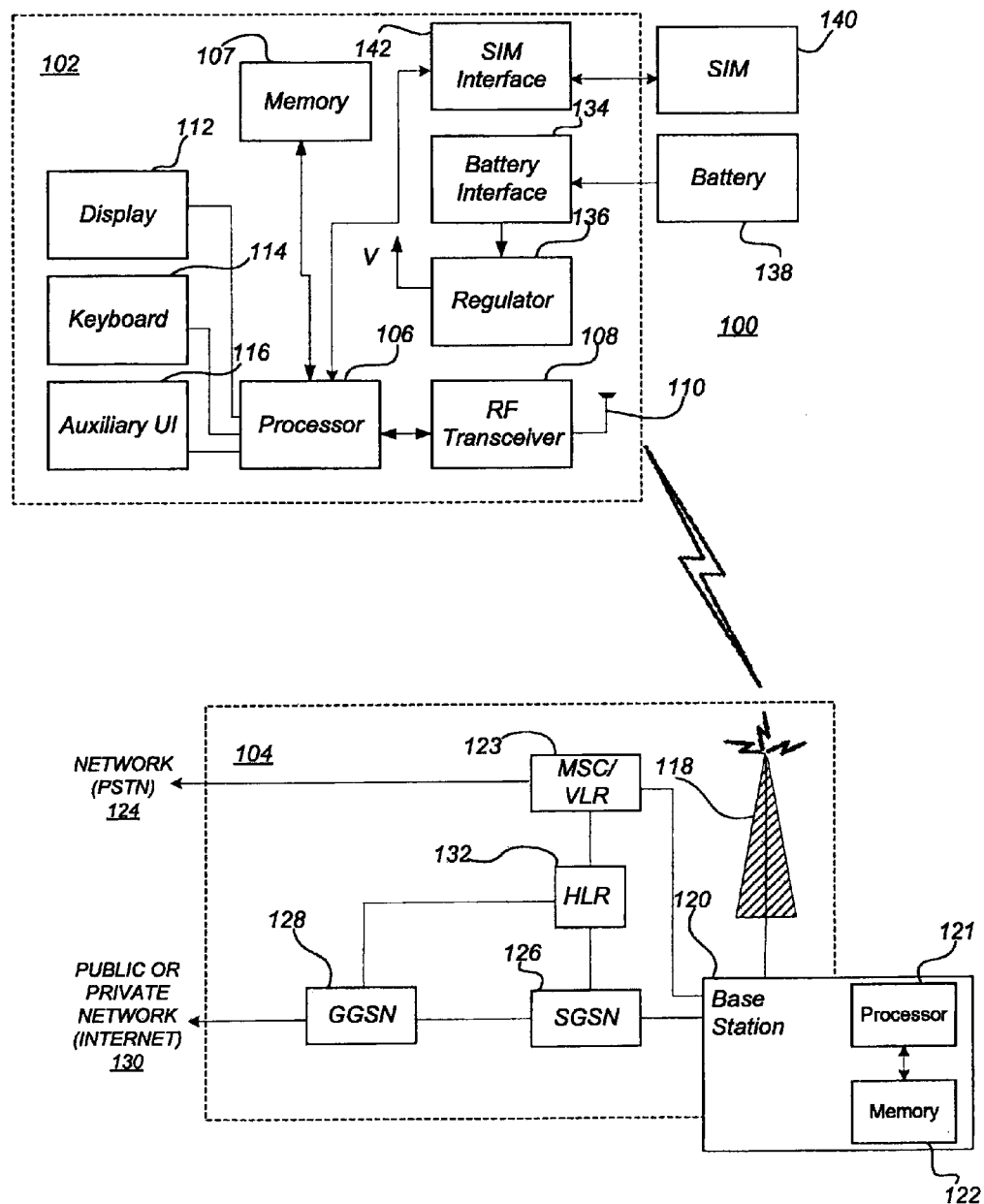
FIG. 1 is a block diagram of an exemplary communication system which includes user equipment (UE) such as a wireless or mobile communication device which communicates through a wireless communication network with a base station (BS)

The present disclosure provides a system and method for reducing timeslots for monitoring during data transmission. The method may include identifying timeslots for uplink and downlink communications between the user equipment and the base station, monitoring a predetermined number of timeslots for communications, tracking usage of at least a portion of the timeslots identified for at least one of uplink communications and downlink communications, and upon reaching a predetermined usage metric related to at least one of uplink communications and downlink communications, and triggering an automatic reduction in a number of timeslots monitored by the user equipment to less than the predetermined number of timeslots.

In one implementation, the present system includes a UE for use with a communications network including a base station. The UE comprises a processor configured to receive a timeslot assignment from the base station for uplink and/or downlink communications with the base station, monitor a predetermined number of timeslots assigned for communications based on the timeslot assignment received from the base station, track usage of at least a portion of the timeslots assigned for one of uplink and downlink communications and upon usage of at least a portion of the timeslots assigned for one of uplink and downlink communications reaching a threshold, trigger a unilateral adjustment of a number of timeslots monitored to less than the predetermined number of timeslots.

In another implementation, the present system includes a base station configured to communicate via a communications network for communicating with a UE. The base station includes a processor. The processor is configured to determine timeslots for uplink and downlink communications with the user equipment. The user equipment is configured to monitor the timeslots. The processor is configured to track usage of at least a portion of the timeslots for uplink and downlink communications, and upon usage of at least a portion of the timeslots for uplink and downlink communications reaching a first threshold, trigger a reduction in the number of timeslots allocated for uplink and downlink communications.

The various aspects of the disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, channel, or media. For example, computer readable media can include but are not limited to magnetic storage devices (for example, hard disk, floppy disk, magnetic strips, and the like), optical disks (for example, compact disk (CD), digital versatile disk (DVD), and the like), smart cards, and flash memory devices (for example, card, stick, and the like). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring now to FIG. 1, a block diagram of an exemplary communication system 100 includes a UE 102 (one example of a wireless or mobile communication device) that communicates through a wireless communication network 104. Depending upon system requirements, the present system 100 may be used within other communication systems having different implementations. The UE 102 may include a visual display 112, a keyboard 114, and perhaps one or more auxiliary user interfaces (UI) 116, each of which are coupled to a processor or controller 106. The processor 106 is coupled to a memory 107, radio frequency (RF) transceiver circuitry 108, and an antenna 110. Typically, the processor 106 is embodied as a central processing unit (CPU) that runs operating system software in a memory component (not shown). The processor 106 will normally control overall operation of UE 102, whereas signal processing operations associated with communication functions are typically performed in RF transceiver circuitry 108. The processor 106 interfaces with the device display 112 to display received information, stored information accessed from the memory 107, user inputs, and the like. The keyboard 114, which may be a telephone type keypad or full or partial alphanumeric keyboard (physical or virtual), is normally provided for entering data for storage in the UE 102, information for transmission to the network 104, a telephone number to place a telephone call, commands to be executed on the UE 102, and a variety of other or different user inputs.

The UE 102 sends communication signals to and receives communication signals from the network 104 over a wireless link via the antenna 110. The RF transceiver circuitry 108 performs functions similar to those of a tower station 118 (for example, a base transceiver station (BTS)) and a base station (BS) or base station controller (BSC) 120, including for example modulation/demodulation and, possibly, encoding/decoding and encryption/decryption. To this end, the BS 120 may include, for example, a processor 121 and memory 122. It is also contemplated that the RF transceiver circuitry 108 may perform certain functions in addition to those performed by the BS 120. It will be apparent to those skilled in art that the RF transceiver circuitry 108 will be adapted to particular wireless network or networks in which the UE 102 is intended to operate.

The UE 102 includes a battery interface 134 for receiving one or more rechargeable batteries 138. The battery 138 supplies electrical power to electrical circuitry in the UE 102, and the battery interface 134 provides for a mechanical and electrical connection for the battery 132. The battery interface 134 is coupled to a regulator 136 that regulates power to the UE 102. The UE 102 may be a handheld portable communication device, which includes a housing that carries and contains the electrical components of the UE 102 including the battery 138. The UE 102 may operate using a subscriber identity module (SIM) 140 that is connected to or inserted in the UE 102 at a SIM interface 142. The SIM 140 is one type of a conventional "smart card" used to identify an end user or subscriber of the UE 102 and to personalize the device, among other things. To identify the subscriber, the SIM 140 may contain user parameters such as an international mobile subscriber identity (IMSI). The SIM 140 may store additional user information for the UE as well, including datebook or calendar information and recent call information.

The UE 102 may be a single unit, such as a data communication device, a cellular telephone, a multiple-function communication device with data and voice communication capabilities, a personal digital assistant (PDA) enabled for wireless communication, or a computer incorporating an internal modem. Alternatively, the UE 102 may be a multiple-module unit comprising a plurality of separate components, including but in no way limited to a computer or other device connected to a wireless modem. In particular, for example, in the UE block diagram of FIG. 1, the RF transceiver circuitry 108 and antenna 110 may be implemented as a radio modem unit that may be inserted into a port on a laptop computer. In this case, the laptop computer would include the display 112, the keyboard 114, one or more auxiliary UIs 116, and the processor 106 embodied as the computer's CPU. The computer or other equipment may not normally be capable of wireless communication and may be adapted to connect to and effectively assume control of the RF transceiver circuitry 108 and the antenna 110 of a single-unit device such as one of those described above.

The UE 102 communicates with and through the wireless communication network 104. The wireless communication network 104 may be a cellular telecommunications network. The wireless network 104 may be configured in accordance with the requirements of General Packet Radio Service (GPRS) and Global Systems for Mobile (GSM) technologies. Alternatively, UE 102 may further operate in accordance with Enhanced Data rates for GSM Evolution (EDGE) or Enhanced GPRS (EGPRS). In such an environment, the wireless network 104 includes the base station (BS) 120 with the associated tower station 118 and also a Mobile Switching Center (MSC) 123, a Home Location Register (HLR) 132, a Serving General Packet Radio Service (GPRS) Support Node (SGSN) 126, and a Gateway GPRS Support Node (GGSN) 128. The MSC 123 is coupled to the BS 120 and to a landline network, such as a Public Switched Telephone Network (PSTN) 124. The SGSN 126 is coupled to the BS 120 and to the GGSN 128, which is in turn coupled to a public or private data network 130 (such as the Internet). The HLR 132 is coupled to the MSC 123, SGSN 126, and GGSN 128.

The station 118 is a fixed transceiver station, and the station 118 and BS 120 may be referred to as transceiver equipment. The transceiver equipment provides wireless network coverage for a particular coverage area commonly referred to as a "cell." The transceiver equipment transmits communication signals to and receives communication signals from UEs within its cell via station 118. The transceiver equipment normally performs such functions as modulation and possibly encoding and/or encryption of signals to be transmitted to the UE in accordance with particular, usually predetermined, communication protocols and parameters, under control of its controller. The transceiver equipment similarly demodulates and, possibly, decodes and decrypts, if necessary, any communication signals received from the UE 102 within its cell. Communication protocols and parameters may vary between different networks. For example, one network may employ a different modulation scheme and operate at different frequencies than other networks.

For all UEs 102 registered with a network operator, permanent data (such as the UE 102 user's profile) as well as temporary data (such as the UE's 102 current location) may be stored in the HLR 132. In case of a voice call to the UE 102, the HLR 132 may be queried to determine the current location of the UE 102. A Visitor Location Register (VLR) of the MSC 123 is responsible for a group of location areas and stores the data of those UEs that are currently in its area of responsibility. This includes parts of the permanent UE data that have been transmitted from the HLR 132 to the VLR for faster access. However, the VLR of the MSC 123 may also assign and store local data, such as temporary identifications. Optionally, the VLR of the MSC 123 can be enhanced for more efficient co-ordination of GPRS and non-GPRS services and functionality, for example, paging for circuit-switched calls which can be performed more efficiently via the SGSN 126, and combined GPRS and non-GPRS location updates.

The SGSN 126 may be located at the same hierarchical level as that MSC 123 and keeps track of the individual locations of UEs. The SGSN 126 also performs security functions and access control. The GGSN 128 provides interworking with external packet-switched networks and is connected with SGSNs (such as the SGSN 126) via an IP-based GPRS backbone network. The SGSN 126 performs authentication and cipher setting procedures based on algorithms, keys, and criteria (e.g. as in existing GSM).

During ongoing, traditional, GPRS or EGPRS packet data communications between the UE 102 through the wireless communication network 104, when the UE 102 is assigned a downlink temporary block flow (TBF), the UE 102 is required to monitor all downlink timeslots in its assignment in the event that the network transmits data during those timeslots. For simplicity, communications to and from the UE 102 will be described as being with the network 104, rather than a particular entity of the network 104, such as the BS 102. However, one of skill in the art will readily appreciate that such communications are often between the UE 102 and the BS 120, or other entity. If the UE 102 has an assigned uplink TBF, it is required to monitor all timeslots on which the uplink state flag (USF) could be sent to dynamically allocate uplink resources. If the UE 102 has both uplink and downlink TBFs, the UE 102 monitors as many relevant downlink timeslots as possible, taking into account any uplink transmissions. Thus, in traditional communications protocols utilized with the system 100 of FIG. 1, a very structured communications protocol is utilized whereby the UE 102 and BS 120 cooperate according to a coordinated DL, UL, and monitoring algorithm that permits the BS 120 to control the allocation of resources.

However, the constant monitoring of assigned timeslots results in the expenditure of significant depletion of the battery 138. This is particularly undesirable in the case that either the network 104 or the UE 102 has nothing to send. Accordingly, in many circumstances, it is difficult to determine whether it is more efficient to maintain an active communication connection to improve performance, or to shutdown or minimize the connection to reduce energy use. For example, during web browsing, after the download of a page (whereby the last transmission of RLC-layer data may correspond to the TCP-layer ACK sent by the UE 102), the UE 102 may immediately request further downloads without user input. This may occur when the UE 102, after downloading a web page, immediately proceeds to retrieve all embedded images within that page. Using the same application, however, the UE 102 may have received all of the information required to render the page, and may not send or receive data via the network 104 for some time as the UE 102 waits for the user to request a new page or take some other action. In a file-transfer protocol (FTP) download, on completion of a download, the UE 102 may either initiate a subsequent transfer (e.g. if the user has requested multiple files and the ftp application limits the number of concurrent downloads), or may stop to await user input. Similarly, in a data upload, the last data to be sent may be from the network 104 to the UE 102 (final acknowledgement); however, the BS 120 is agnostic to higher layer protocols and applications, and cannot determine whether or not further data may be sent by the UE 102. In these examples, the network 104, and in particular the BS 120, are not able to determine whether additional network communications will take place, or whether there will be some delay due to waiting for user input.

As shown by these examples, difficulties may be associated with bidirectional assignments coordinated between the BS 120 and UE 102. Specifically, scenarios where human interaction is involved (such as pauses in data transmission corresponding to some 'thinking/processing time' by the user), scenarios where the BS 120 is generally unable to determine when a pause will start or how long a pause will last for, and scenarios where pauses generally result in simultaneous breaks in uplink and downlink data transmission can all give rise to reduced battery life and/or slow response times for the user, depending on how the network is operated.

For example, in some network implementations, the network 104 or BS 120 attempts to determine or guess when no data will be sent by the UE 102 and explicitly release the corresponding TBF resources (for example, see sub-clause 9.3.2.6 in 3GPP TS 44.060 v.8.3.0 "General Packet Radio Service (GPRS); Mobile Station (MS)-Base Station System (BSS) interface; Radio Link Control/Medium Access Control (RLC/MAC) protocol (Release 8)"). After releasing the corresponding TBF resource, when new data is to be sent, a TBF is re-established using existing procedures. This process, although allowing for the release of resources, does not allow for the quick resumption of data transmissions. That is, this may lead to a user-perceived delay when further data is to be sent while resources are re-established.

Alternatively, in some cases, it is possible to use an 'extended uplink TBF mode' for the network 104 and, thereby, allow an uplink TBF to continue, even though the UE 102 has nothing to send. The BS 120 may require the UE 102 to respond to all uplink allocations (for example, signaled by valid USFs) by sending dummy blocks when the UE 102 has nothing else to send, or may allow the UE 102 to simply ignore USFs that it has no use for. A similar approach is permitted for the downlink, where the network 104 can ensure that the TBF is maintained, even though there is no data to send, by sending dummy blocks. When new data is to be sent, it is sent using the existing resources. This process maintains the coordinated DL, UL, and monitoring algorithm utilized between the UE 102 and BS 120 and control of the BS 120 over allocating resources. However, while allowing for quick resumption of data transmission, this process is a substantial energy drain on the battery 138 of the UE 102 because the UE 102 must continuously monitor the network 104 communications and send dummy blocks to maintain access to data transmission services.

In other attempts to address these issues, explicit signaling may be specified by the network 104 to tell the UE 102 that it may monitor only a subset of timeslots corresponding to its existing assignment. This is in effect a promise that when any subsequent downlink data is to be sent, it will be sent using only the signaled subset of resources. Similarly, signaling may be used to indicate that any uplink allocation will be signaled (by way of the assigned USF(s)) on a reduced set of timeslots. Again, this method preserves the coordinated DL, UL, and monitoring algorithm utilized between the UE 102 and BS 120 and control of the BS 120 over allocating resources. This method, however, may be problematic as the reduction is controlled by the BS 120 which has little, if any, knowledge of the application in use by the UE 102, and if or when any subsequent data transfer is likely to start. Also, the independent control of uplink and downlink monitoring is complex, and the dynamic signaling (every time the monitoring timeslots are reduced) is also complex. Finally, when non-persistent mode (NPM) is used in this method, the UE 102 may not receive the downlink block indicating the bitmap reduction and may consider this acceptable according to the rules of NPM operation, which allows for blocks to be considered 'abandoned' by the receiver if it has not successfully received the block after a certain length of time.

Figure 2:
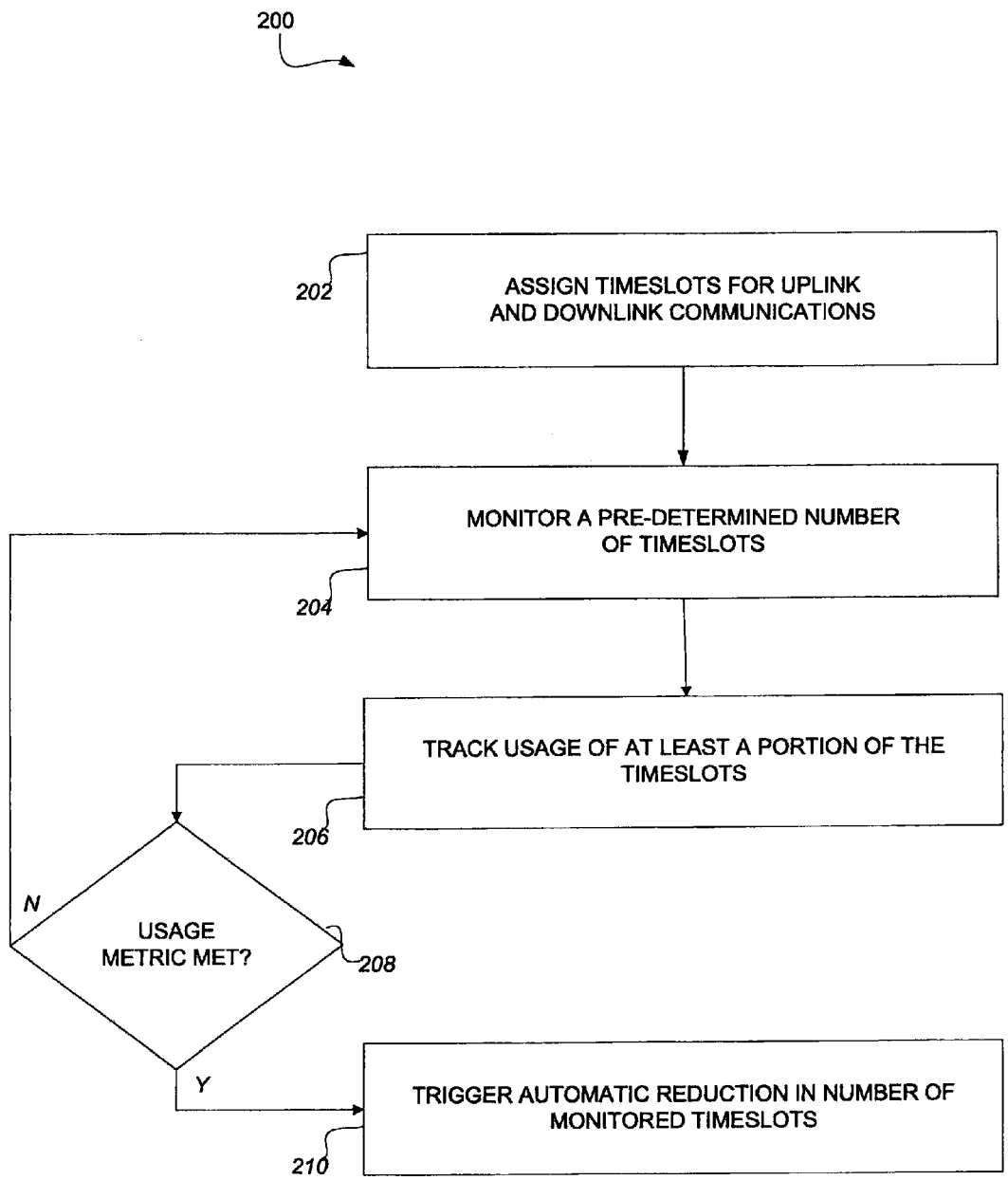
FIG. 2 is a flow chart setting forth the steps of an example method for reducing the number of timeslots monitored during data transmission between UE and a BS.

Turning now to FIG. 2, the steps 200 of a method for reducing a number of timeslots for monitoring during data transmission between the UE 102 and network 104 of FIG. 1 are provided. As will be described, the methods, algorithms, and protocols of the present disclosure break with the traditional paradigm of rigidly coordinated DL and UL resource assignments and strict explicit control by the BS 120 over assigning resources. Specifically, as will be described, by allowing the UE 102 and the BS 120 to adjust the number of timeslots to be monitored automatically and independently, the UE 102 will use less energy to communicate with network 104/BS 120, while reducing the potential for responsiveness lags that would be appreciable to the user of the UEs 102. That is, the present disclosure provides a system and method whereby the UE 102 can adjust the number of timeslots to be monitored and the BS 102 can reduce the number of timeslots which it expects the UE 102 to monitor automatically and irrespective of each other.

The process steps illustrated in FIG. 2 begin at process block 202 by assigning timeslots for uplink and downlink communications. According to traditional protocols described above, this assignment results in the UE and BS monitoring a predetermined number of the assigned timeslots, as indicated at process block 204. The usage of each monitored timeslot is tracked at process block 206. The usage of each timeslot is then compared to a usage metric at decision block 208. As will be described, this usage metric may act as a threshold value against which the tracked usage is compared. For example, the threshold indicated by the usage metric may be a predetermined number of timeslots assigned for UL and unused by the UE. Other usage metrics may be based on the timeslots used or unused by the BS or network. Thus, as will be described, this is but one example of a usage metric or threshold and many others may be used. Regardless of the specifics of the usage metric and particulars of how action is triggered, if the tracked usage continues to exceed a threshold indicated by the usage metric, the predetermined number of timeslots continues to be monitored.

However, if the tracked usage falls below a threshold indicated by the usage metric, the number of monitored timeslots may be reduced in step 210. Thus, as will be described, this evaluation of the actual usage with respect to the usage metrics acts as a trigger. These triggers characterize the communication activities between the UE 102 and network 104/BS 120 and may identify a minimum threshold volume of traffic, a time period during which no transmission takes place, a number of under-utilized USFs, or any other characteristic of the communication activities between UE 102 and network 104. Upon determining that a particular trigger has been satisfied, either UE 102 or network 104 may unilaterally, or together, take action to minimize the number of timeslots being monitored by the UE 102 and/or the number of timeslots that may be allocated to the UE 102 by the network 104.

To implement method 200, a number of triggers are defined. Each trigger may be based on the absence of data transmissions, or other characteristics of the communication activity between the UE 102 and network 104. The triggers may be the same or different for the UE 102 and network 104. Upon determining that a trigger event has occurred, the timeslots to be monitored by the UE 102 are reduced or the timeslots used by network 104 to send downlink data or USFs to the UE are reduced, or both. In one example, trigger parameters may be specified in a communication standard, defined in assignment messages and/or established during packet data protocol (PDP) context establishment procedures, specified and/or signaled at TBF establishment or modification, or any combination of these.

In one implementation, basic triggers are specified. The basic trigger definitions include parameters, for example, such as a time limit or a number of non-responded-to USFs. The basic triggers may also be communicated at TBF establishment or modification or, alternatively, at PDP context establishment, with the BSC being informed during PFC negotiation for example.

A trigger may be designed to detect a lack of data transmissions by both the network 104/BS 120 and UE 102 over a period of time. The trigger may be specified using time measurement (e.g., a number of seconds), or a predetermined period of time during which a specified number of USFs which allocate uplink resources to the UE are not used to send data. A lack of data in this context may be defined to include the sending of dummy blocks such as a PACKET UPLINK DUMMY CONTROL BLOCK that contain no user data.

Figure 3:
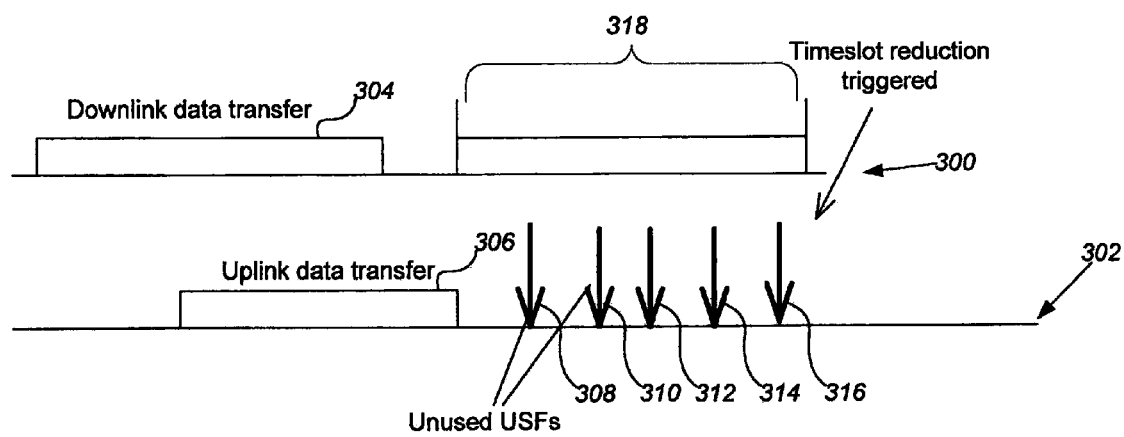
FIG. 3 illustrates an example for defining a trigger through the absence of a downlink transfer and an uplink transfer for a period of 1 second, or a period in which 5 consecutive USFs are unused and no downlink transfer occurs, whichever happens earlier.

Other trigger definitions may include a time period or number of radio block periods in which no data has been sent by the UE 102 and/or network 104/BS 120, a number of uplink allocated radio blocks that have not been used to send data, a number of radio block periods during which uplink resources were allocated but were not used to send data, or any combination of the above. Referring now to FIG. 3, one example of a trigger can be defined by the absence of communication from the UE. FIGS. 3-12 are timing diagrams for use in illustrating the disclosed system and method for adjusting timeslot monitoring. The timing diagrams will be described with respect to the perspective of the UE. Thus, a downlink channel 300 and uplink channel 302 are shown. Referring particularly to FIG. 3, a downlink data transfer 304 is shown that represents data transferred from the BS to the UE. In addition, uplink data transfer 306 is shown that represents data transferred from the UE to the BS. However, following after the downlink data transfer and the uplink data transfer 306 are five (5) consecutive unused USFs 308-316 (that is to say, USFs where the corresponding uplink allocation was not used to send user data) that extend within a given time duration 318. In this example, the time period since the most recent uplink or downlink data transfer or the number of unused USFs 308-316 may serve as the usage metric. In this case, the expiration of a predetermined duration or a period in which a predetermined number of consecutive USFs are unused and no downlink transfer occurs, whichever happens earlier, may serve as a trigger for a timeslot monitoring reduction. For example, the predetermined time period may be a period of 1 second and the predetermined number of consecutive USFs may be 5. Thus, in the example in FIG. 3, a timeslot reduction is triggered by unused USF 316 because the time period 318 since the most recent data transfer had yet to exceed the predetermined threshold.

Figure 4:
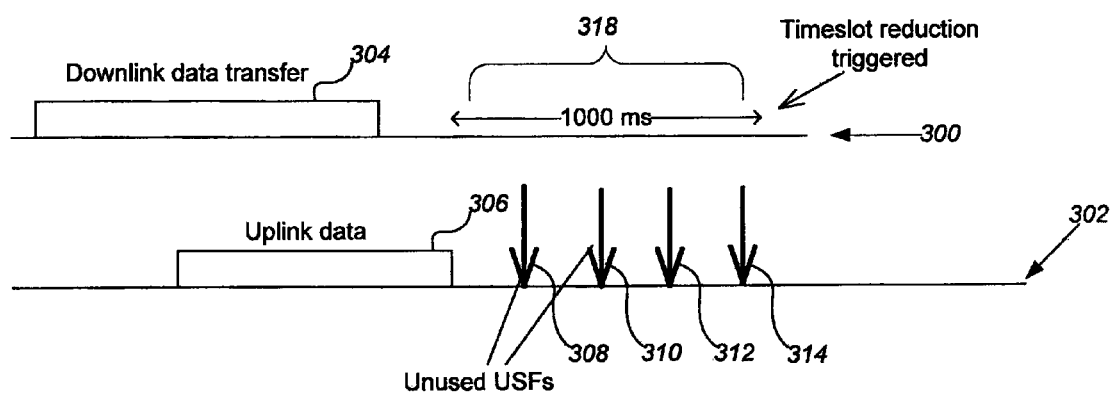
FIG. 4 illustrates an example for defining a trigger through 1 consecutive second of no data transfer.

However, turning to FIG. 4, as illustrated, the trigger may be caused by the time period 318 (during which no data transfer occurred) exceeding the predetermined threshold. Only four unused USFs 308-314 had occurred before the predetermined time period elapsed and, as described in this example, the threshold for unused USFs was 5.

Figure 5:
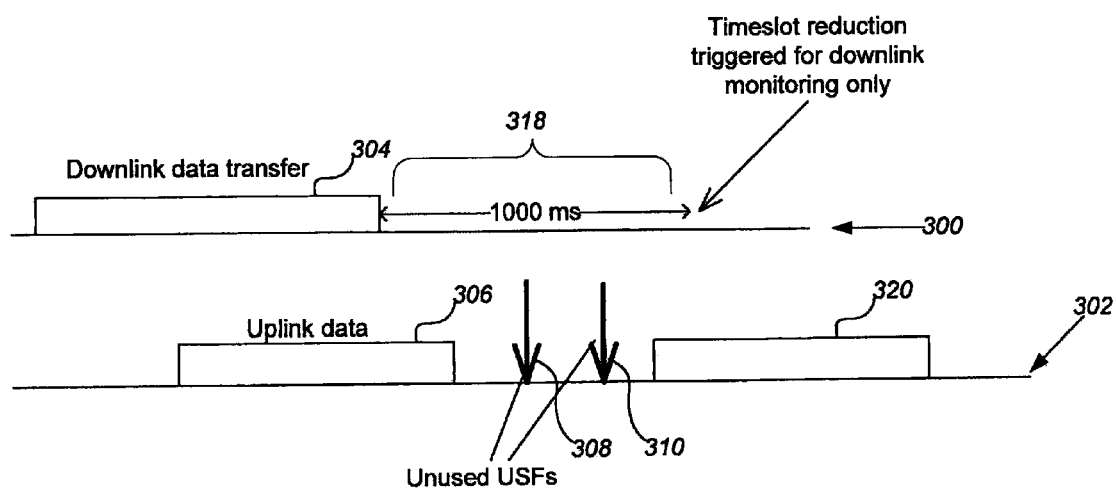
FIG. 5 illustrates an example for using a trigger that applies to downlink dual carrier data transmissions wherein, after detecting the trigger, the timeslot reduction procedure applies independently on the two channels and where uplink and downlink timeslot reduction algorithms operate independently.

Referring now to FIG. 5, another example for raising and utilizing a trigger is illustrated where reductions in timeslot monitoring for the downlink channel 300 and the uplink channel 302 may occur independently. In this case, only two (2) unused USFs occur and an uplink data transfer 320 occurs with a break in uplink transfer having a duration less than the predetermined time period. However, with respect to the downlink channel 300, the predetermined time period elapses without a downlink data transfer. As a result, the timeslot reduction procedure may be applied independently to the downlink channel 300 while the uplink channel 302 continues in standard, or non-reduced timeslot monitoring. Thus, the timeslots to be monitored for downlink data may be reduced independently of the amount of uplink data being sent, provided that the downlink timeslots that need to be monitored for USFs allocating uplink data transfer are maintained, and vice versa.

Figure 6:
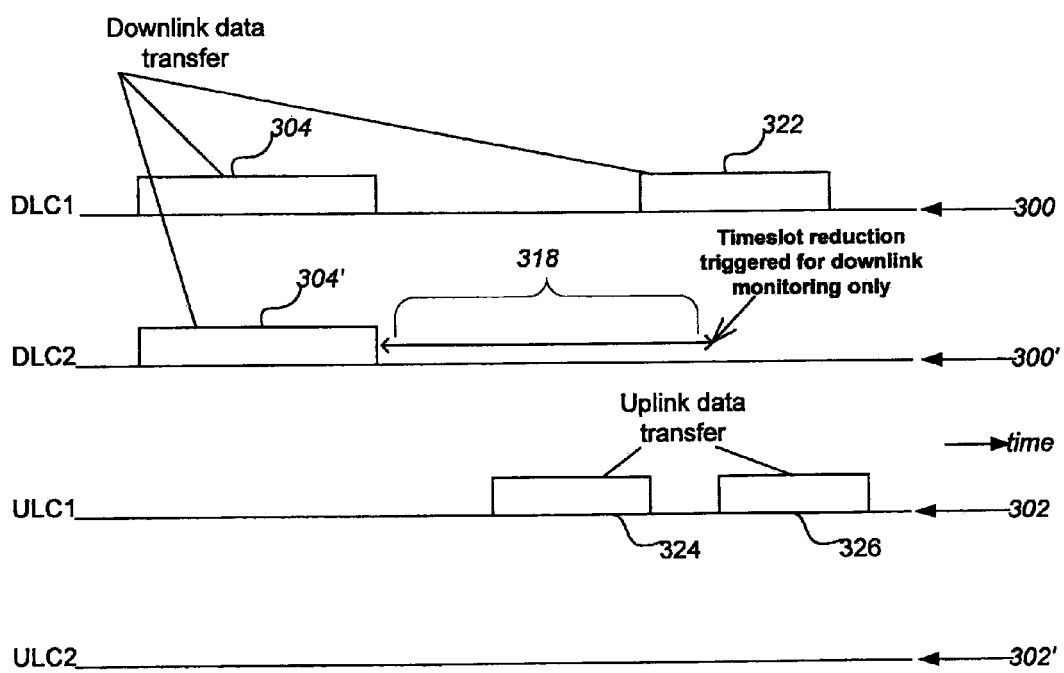
FIG. 6 illustrates an example of using a trigger using downlink dual carrier assignment.

Referring now to FIG. 6, another example for raising and utilizing a trigger is illustrated, this time in a downlink dual carrier assignment. As illustrated, in addition to the first downlink channel 300 and uplink channel 302, a second downlink channel 300' and uplink channel 302' are used. In this case, multiple downlink data transmissions may occur simultaneously, such as downlink data transmission 304 and downlink data transmission 304', on each downlink channel 300, and 300'. The reduction in timeslot monitoring may apply to each downlink channel 300, and 300'. In this example, there is no uplink assignment on uplink channel 302', and, because there are no unused USFs, the trigger for downlink channel 300' determined by the predetermined time period elapsing is triggered and timeslot monitoring reduction may take place. In this example, timeslot reduction applies independently to the two pairs of carriers (300 and 302) and (300' and 302'). Therefore, with respect to downlink channel 300 and uplink channel 302, no timeslot monitoring reduction is triggered because a subsequent downlink communication 322 is sent and two uplink data communications 324, 326 are sent, thereby avoiding a trigger based on a predetermined time period between communications elapsing or consecutive unused USFs.

Figure 7:
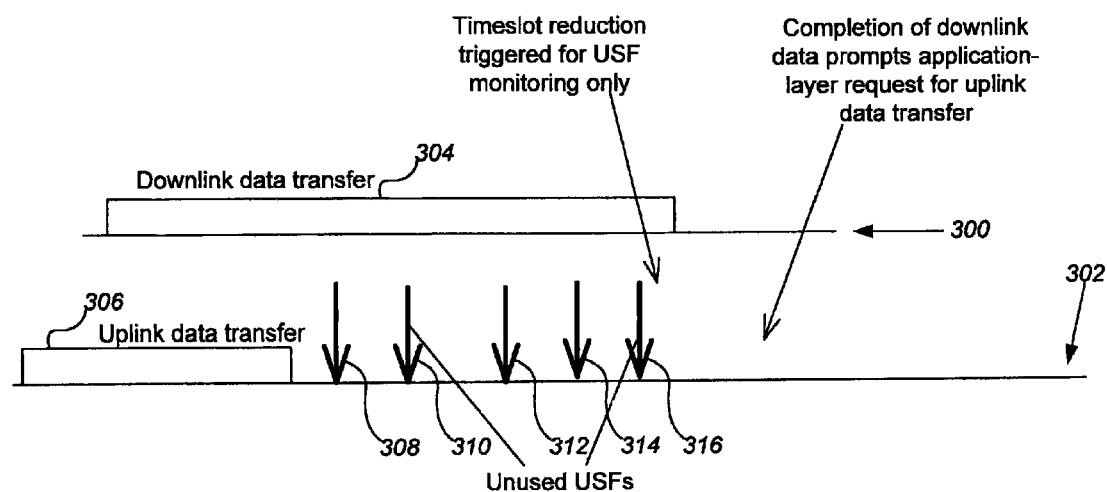
FIG. 7 illustrates an example of using a timeslot reduction algorithm, wherein the timeslots to be monitored for uplink state flags (USFs) are reduced as a result of multiple unused USFs.
Figure 8:
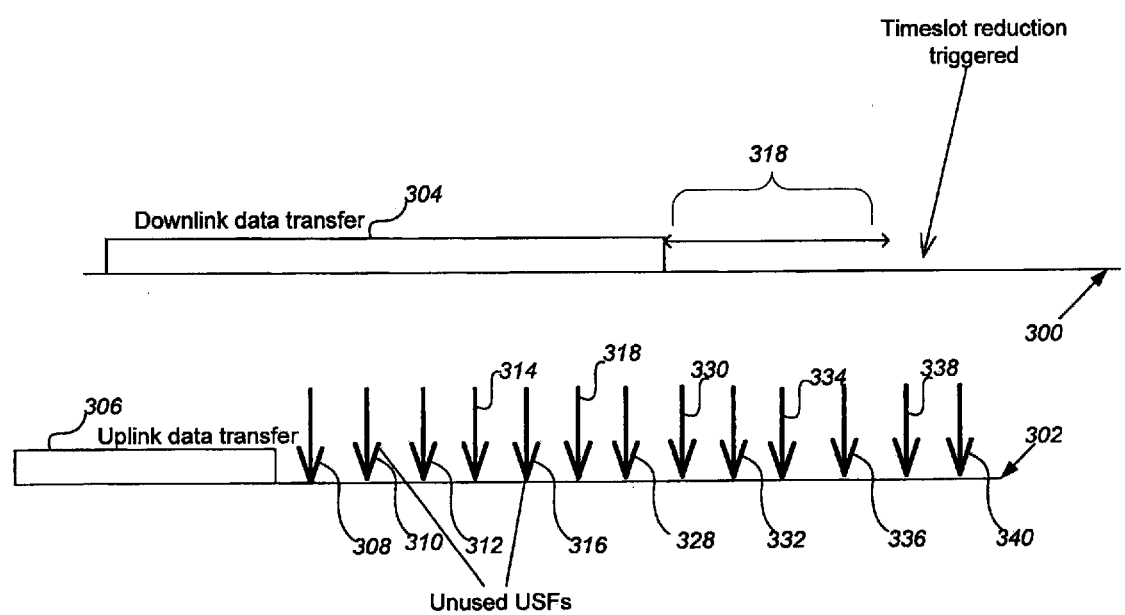
FIG. 8 illustrates another example of using a timeslot reduction algorithm, wherein a trigger is used for the reduction of both USF and downlink monitoring.

Although a trigger may be based on the lack of uplink activity alone, such a trigger may result in inefficient system operation. As illustrated in FIG. 7, the timeslots to be monitored for USFs are reduced as a result of multiple unused USFs 308-316. Due to the commonality of timeslots used for USF monitoring and downlink data transfer 304, however, the reduction in USF timeslots may not save substantial battery power because some or all of these timeslots will still be decoded to receive the downlink data 304. Furthermore, if the downlink data transfer 304 triggers an upper-layer request to transmit uplink data, there could be a delay or poorer uplink bandwidth as the number of timeslots which can be allocated in the uplink is reduced. Referring to FIG. 8 and continuing with the example from FIG. 7, if the downlink transfer 304 is followed by a pause in data transmission, while, for example, the user reads/watches the downloaded information, then the triggers as shown in FIGS. 3 & 4 would occur anyway in the case illustrated in FIG. 8. That is, either the predetermined time period 318 would elapse or the trigger would be raised due to continuing unused USFs 330-340. Because of the expected commonality of timeslots, the additional benefit of the trigger shown in FIG. 7 (the difference in battery consumption) compared with the case in FIG. 8 (for example, without that trigger) may be negligible.

Depending upon the system implementation, one or more triggers may be specified, corresponding to a specific stage of the timeslot reduction algorithm. The same number of triggers may be defined for both the network and the UE, with each trigger corresponding to a stage in the algorithm.

In one implementation, the triggers are different for network 104/BS 120 and UE 102 of FIG. 1, with the network triggers occurring (in normal operation in good radio conditions) earlier than those on the UE 102 side. This allows for the possibility that a trigger occurs as USFs or other downlink data are being transferred between the BSC or scheduler of network 104/BS 120 and UE 102, or in case that one or more USFs or downlink data blocks were not successfully received or decoded by the UE 102, and ensures that network 104 or BS 120 is conservative in which timeslots it assumes UE 102 is monitoring. For example, if a trigger defining a period of 1 second, or 5 unused uplink resource allocations (URAs) is defined for network 104, a corresponding trigger for the UE 102 may be that no data is sent in either direction for 1.5 seconds, or the UE 102 has not responded to 8 URAs, whichever occurs sooner.

To avoid timeslot reduction causing problems with acknowledgement of control blocks (including assignments), the system may define a minimum period since the last assignment message before any trigger can occur. Assignment messages may include messages which modify, add or reduce the set of resources assigned to UE 102. Examples are PACKET TIMESLOT RECONFIGURE messages, PACKET UPLINK ASSIGNMENT messages, HANDOVER COMMAND messages, and the like. In one implementation, any time periods or inactivity detection as specified by the trigger definition may not start until some specified time period after the last assignment. Here, 'assignment' may include assignment due to handover.

In the case that an assignment message (for example, assigning new, or different resources) is sent to the UE, the overall timeslot reduction procedure may either restart completely, with all timeslots that are part of the new assignment being monitored, or may continue. In one implementation, an assignment message resulting in an increase in resources leads to the timeslot reduction procedure being restarted, while an assignment message which results in a decrease in resources leads to the procedure continuing. In the latter case, the timeslot reduction algorithm specifies which timeslots are to be monitored so that if the timeslots which were being monitored prior to the new assignment are not part of the new assignment, new timeslots to be monitored can be defined. If, in a downlink dual carrier assignment, a new assignment message which modifies assigned resources on only one channel is received, the timeslot reduction algorithm may continue on the second channel, independently.

Figure 9:
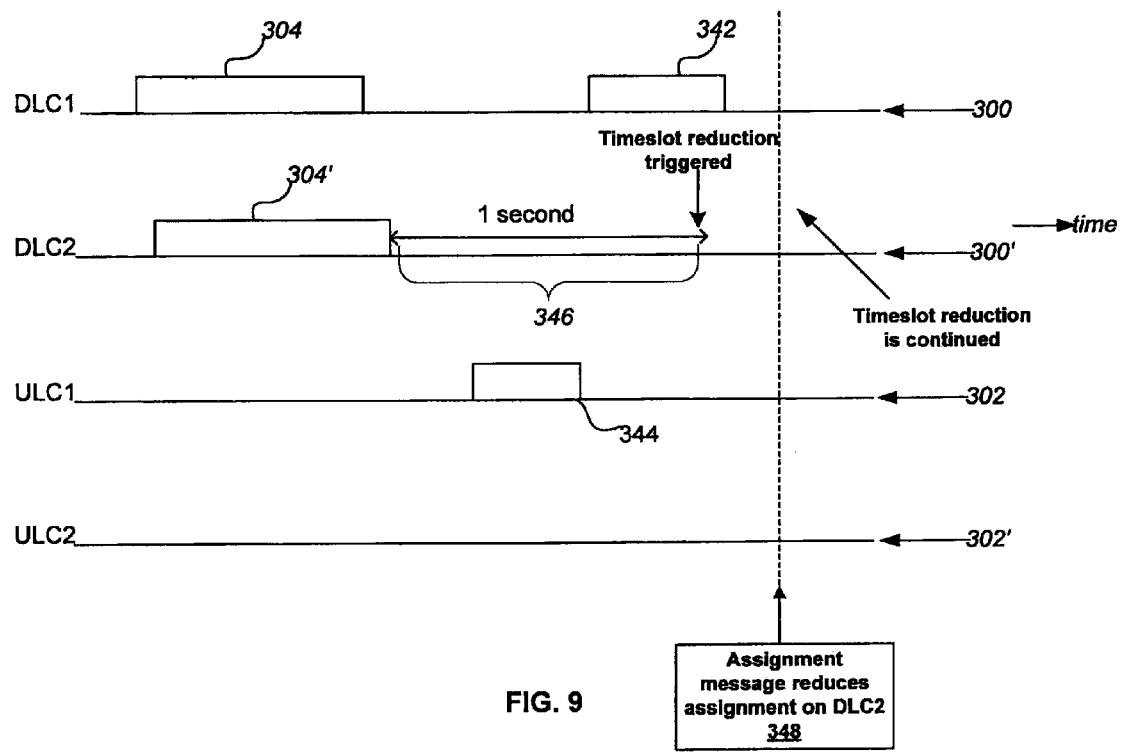
FIG. 9 illustrates an example of using a timeslot reduction algorithm with a downlink dual carrier assignment, wherein the trigger algorithm and any ongoing reduction in monitored timeslots continues after an assignment message is received.
Figure 10:
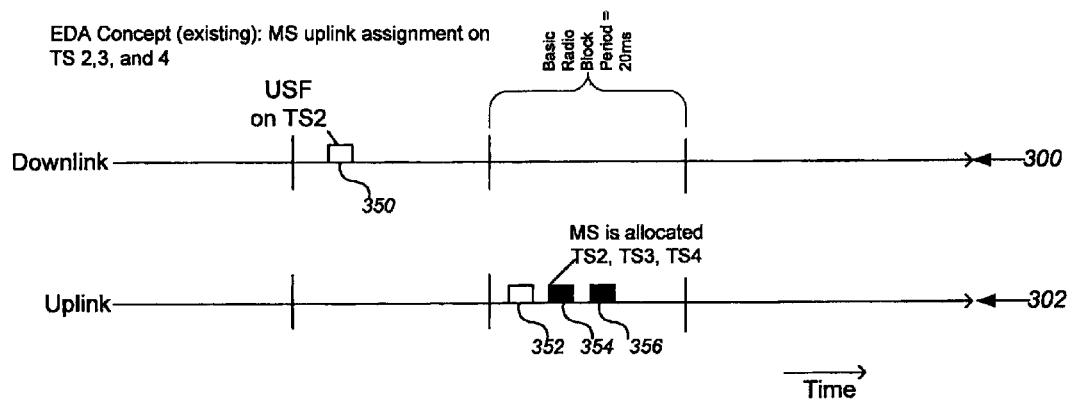
FIG. 10 illustrates an example of using a timeslot reduction algorithm with an extended dynamic allocation (EDA) protocol when a reduced set of timeslots is being monitored.

In some applications, it is beneficial to allow the trigger algorithm (including any ongoing reduction in monitored timeslots) to continue after an assignment message is received (as illustrated by FIG. 9 and described below), such as when the assignment message reduces the total amount of resources assigned to the UE. This may operate to avoid simultaneous attempts to reduce the number of monitored timeslots by both reducing the assignment, and by means of the timeslot reduction algorithm whereby, otherwise, the number of monitored timeslots may actually increase as a result of the assignment message.

Referring to FIG. 9, a dual downlink and uplink channel system is illustrated receiving an assignment message after timeslot reduction is triggered. The downlink channel 300, uplink channel 302, second downlink channel 300' and uplink channel 302' are used. Using the system, multiple downlink data transmissions may occur simultaneously, such as the downlink data transmission 304 and downlink data transmission 304', on each downlink channel 300, and 300'. Alternatively, data transfer may occur independently on a single channel, as indicated by the downlink data transmission 342. Similarly, data uplink transmissions, such as the data transmission 344, may occur simultaneously, quasi-simultaneously, or independently, as required by various specifications or system requirements. As shown on FIG. 9, a trigger occurs on the downlink channel 300' due to the expiration of a predetermined time period 346 initiating timeslot monitoring reduction. After timeslot monitoring reduction is triggered, an assignment message 348 is issued to the UE 102. This assignment message 348 may grant to the UE increased or decreased resources. If the assignment message 348 further reduces the timeslot assignment for downlink channel 300', as indicated in FIG. 9, timeslot reduction on downlink channel 300' is continued, even after downlink channel 300' receives assignment message 348. On the other hand, if an assignment message is received that increases the resources for this UE, reduced timeslot monitoring may be discontinued unless another trigger re-initiates reduced timeslot monitoring. In other cases, it may be desirable to continue with reduced timeslot monitoring despite receiving an assignment message granting increased resources.

Upon detection of a trigger event, timeslot reduction is initiated. Generally, timeslot reduction allows the UE 102 to reduce the number of downlink timeslots which it monitors in an effort to control energy expenditure and attempt to maximize battery life. With reference to network 104, a trigger reduces the range of timeslots during which the network 104 can transmit USFs, downlink data, or other control information to the UE 102. Depending upon the system implementation, no additional explicit signaling is used after the trigger event occurs to initiate the timeslot monitoring reduction.

In some implementations, however, the UE 102 and network 104 may communicate certain confirmation or synchronization messages to ensure both UE 102 and network 104 are participating in the same, or equivalent timeslot reduction activities. For example, although it may not be preferable for explicit signaling from the network 104 to UE 102 to indicate the timeslot reduction, the UE 102 may affirm to network 104 which timeslots it is monitoring. In one implementation, the UE 102 notifies the network 104 by responding to a poll request or USF with a control block indicating its current status. This may be done periodically or by responding using the first available uplink allocation after each trigger to indicate that the trigger has occurred. Although adding communication overhead, this process may reduce the possibility that the network 104 expects the UE 102 to be monitoring timeslots which the UE 102 is not monitoring. In one implementation, the indication from the UE 102 could be an existing dummy block if the UE 102 is not normally required to send dummy blocks when it has no other data to send.

Each trigger may be associated with a specific timeslot reduction algorithm for determining the process by which the reduction in timeslot monitoring takes place after a trigger is detected. For example, the reduced set of timeslots may be determined by means of an algorithm known in advance to both the UE 102 and network 104 (although UE 102 and network 104 may be configured to implement different trigger algorithms). Which timeslot reduction algorithm to implement may be identified as part of the TBF establishment/modification processes or other communication process between the UE 102 and network 104, or may be identified by means of some specified, deterministic algorithm or a combination of the two.

In one implementation the timeslot reduction algorithm takes into account timeslots which (according to the current assignment) may be monitored both for USFs and downlink data and reduces the requirement to monitor other timeslots that are used only for USFs or only for downlink data. Depending upon the timeslot reduction algorithm, at a point of maximum reduction of timeslot monitoring, no more than 1 timeslot (or in the case of reduced transmission time interval (RTTI) downlink or RTTI USF mode, no more than two timeslots) may be monitored in any TDMA frame, and is used both for downlink data and for USF signaling. Depending upon the system implementation, multiple triggers may occur sequentially, each leading to a further reduction in timeslot monitoring.

Various timeslot reduction algorithms may be implemented by each of the UE 102 and network 104 in response to either the UE 102 or network 104 detecting a trigger. For example, a timeslot reduction algorithm may contain 1 or more stages, with each stage corresponding to a trigger. The timeslot reduction algorithm may be implemented by a reduction to those timeslots whose number is common to both uplink and downlink assignments (for example, those timeslots that may be monitored both for USFs and for downlink data), a reduction by a fixed number of timeslots, such as decreasing from either the "left" or "right" (i.e., removing those with the lowest or highest, respectively timeslot numbers first), a reduction by a fixed proportion of timeslots, or a reduction so that in some radio block periods, no timeslots are monitored by the UE 102 (or used by the network to send USFs or downlink data), for example to use/monitor timeslots only in alternate radio block periods. This approach is beneficial in RTTI with USF mode, because RTTI USF mode requires monitoring at least 2 USFs per TDMA frame, and this approach could allow the reduction to the equivalent of 1 USF per TDMA frame on average. Alternatively, the timeslot reduction algorithm may include a reduction to no less than 1 timeslot for uplink allocation and 1 timeslot for downlink data (which may be the same) or in downlink dual carrier implementations, a reduction by removal of all timeslots on channel 2 (or on channel 1, if channel 1 has no uplink resources assigned and channel 2 does). Generally, the timeslot reduction algorithm stages are defined so that they are deterministic, and based upon the current radio resource assignment.

The timeslot reduction algorithm may be configured to remove low-numbered timeslots initially. This may be advantageous in cases involving systems implementing EDA, for example, where EDA continues to operate when timeslot reduction is in use (e.g., less than the complete assignment is being monitored by the UE 102) and the UE 102 may not have reduced its timeslots by the same amount as that expected by the network 104, and may otherwise consider that a USF allocates more uplink resources than is the intention of the network 104. Depending upon the system implementation, the expectation may be that the use of EDA is suspended during timeslot reduction (known both to the UE and the network) or the expectation may be that the use of EDA continues during timeslot reduction.

Alternatively, the network 104 could assign to each UE one or more timeslots that are to be monitored in the event of timeslot reduction, to allow distribution of monitoring for different UEs 102 which share assigned timeslots and to avoid the possibility that multiple UEs 102 in a reduced monitoring state are monitoring the same timeslot.

In some implementations, the determination of whether EDA is to be used by UEs 102 in a reduced monitoring state may be signaled by the network 104, for example, by means of an assignment message. Because EDA can allow the allocation of a large amount of uplink resources by means of a single USF, it may be advantageous to disable EDA for UEs in a reduced monitoring state if the network is heavily congested and such large resource allocation (which may be wasted if the UE 102 has no data to send) would deprive other UEs of uplink resources.

Triggers and any associated timeslot reduction algorithms may be defined independently for uplink data and downlink data (for example, so that after a sustained period where no uplink data is sent, the timeslots to be monitored for USFs are reduced, but no change is made to the monitoring for downlink data) or, jointly (for example, after a sustained period where no uplink or downlink data has been sent, timeslots to be monitored for both USF and downlink data are reduced). In the case of a downlink dual carrier assignment, triggers and algorithms may operate jointly over both pairs of channels (with each pair comprising one uplink channel and one downlink channel), or may operate independently on each pair of channels.

Timeslot monitoring reduction may be specified to occur (in the absence of loss of data/decoding errors) simultaneously (allowing for propagation delays, transmission time and decoding delays) at both the UE 102 and network 104. In one implementation, however, the reduction in timeslot monitoring occurs at the network 104 side first. This approach ensures that the network 104 is conservative and will not overestimate the timeslots being monitored by the UE 102. For example, in the case of poor radio conditions and/or decoding errors by the UE 102, it is important that the network 104 not anticipate that the UE 102 is monitoring particular timeslots after a trigger has cause the UE 102 to ignore those timeslots.

In some circumstances, the UE 102 may determine that it is necessary to delay any decrease in the number of timeslots being monitored. For example, if a user is taking an action using the UE 102 that will result in later network activity (such as preparing an email, or filling out a web-based form), the UE 102 may instruct the network 104 to delay any timeslot monitoring reduction to ensure optimal performance when network communications are ultimately initiated. In one example, to delay a decrease in the number of timeslots being monitored, the UE 102 may respond proactively to a USF either by means of an existing dummy block format, a specified block format or other predetermined communication, even though it does not currently have data to send, to delay a trigger (and hence the reduction of timeslots being monitored). If the UE 102 is aware that it will imminently have data to send or receive, for example because the UE 102 monitors user activity and anticipates a future data transmission need, the UE 102 may elect to delay any reduction in timeslots monitored to allow a higher bandwidth transmission to start sooner.

Depending upon the system implementation, the UE 102 may delay a reduction in timeslot monitoring by undertaking any action indicating the UE 102 wishes to delay the reduction. For example, if the network 104 normally does not require any response to a USF, the UE 102 may delay the timeslot reduction by sending a response. If the network normally does require a dummy response to a USF, then the UE 102 may delay the timeslot reduction by sending a new version of the dummy response.

In contrast, the UE 102 may wish to initiate timeslot monitoring reduction prematurely. If so timeslot reduction may be initiated, for example, by the UE 102 failing to send an anticipated dummy block. This may be useful if the UE 102 determines it has a low battery level, or knows that no transmission is likely to occur.

The method steps 200 illustrated with respect to FIG. 2, may be implemented in a system employing EDA, wherein a reduced set of timeslots is being monitored for communications or other data such as a USF. As previously discussed, depending upon the implementation, EDA may or may not apply when timeslot reduction as implemented by method steps 200 is active. In the first case, where EDA applies when timeslot reduction is active, UE 102 monitors for USF on the reduced timeslot(s) as per the reduction algorithm. In one example, illustrated in FIG. 10, the downlink channel 300 and uplink channel 302 implement EDA. A reduced timeslot number set is defined as timeslot 2 in the downlink channel 300 and the original uplink assignment is for timeslots 2, 3, and 4. In that case, the UE 102 monitors timeslot 2 for a USF 350 transmitted via the downlink channel 300. If the UE 102 detects the USF 350 for itself on the reduced set of timeslots (in timeslot 2 in the example), then it will transmit via the uplink channel 302 on all of its assigned uplink timeslots 352, 354, and 356 that have the same or higher timeslot number than the downlink timeslot on which the USF was received (timeslots 2, 3, and 4 in this example).

Conversely, in the second case where EDA does not apply when timeslot reduction is active, the UE 102 monitors for a USF on the reduced timeslot(s) as per the reduction algorithm (timeslot 2 in this example), and if the UE 102 sees a USF for itself on this reduced set of timeslots (timeslot 2 in this example), then it will transmit on the uplink only on the TS where the downlink USF was received (timeslot 2 in this example).

Although the use of EDA in the above manner may result in efficient transmission of a given amount of data using multiple blocks sent in the same radio block period, the allocation of multiple radio blocks by means of EDA which are subsequently unused (because the UE has no data to send) is inefficient from a system capacity point of view. For example, if the network 104 knows that the UE 102 is using EDA, then, if it sends the UE 102 a USF in slot "n", it needs to reserve slot "n" and all of the uplink timeslots that are assigned to that UE 102 that are higher than "n", and cannot assign them to any other user.

In one implementation of the present system, where EDA is active, the timeslots to be monitored may vary over time, for example, radio block period by radio block period, so that if only one timeslot is monitored in any given radio block period, it is not the same timeslot number in all radio block periods. This gives the network 104 more freedom in allocating uplink resources to the UE 102 to balance the tradeoff between efficient data transmissions from the UE 102 because it can send data in multiple timeslots having only had to receive a single USF, and reduced efficiency in overall management of the network 104 when the network 104 reserves those uplink timeslots for UE 102 and the UE 102 does not use them. In this implementation, in the timeslot reduction algorithm having EDA enabled, the network 104 and UE 102 know to vary the timeslot during which the USF is sent/monitored. This may change periodically, possibly in each radio block period, which allows the UE 102 opportunities to transmit in more than one uplink slot per radio block period, while reducing the penalty to the network 104 by not having this situation every radio block period.

Figure 11:
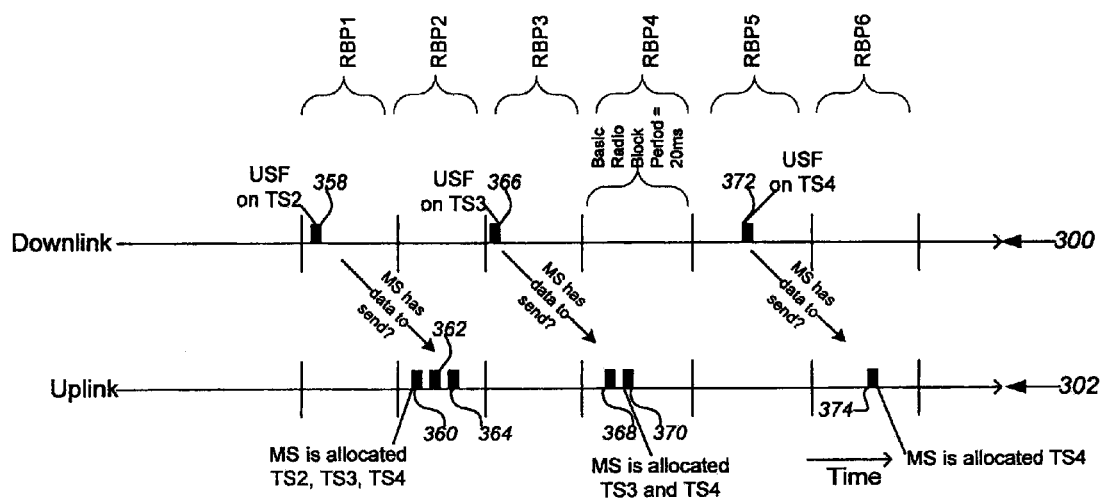
FIG. 11 illustrates another example of using a timeslot reduction algorithm with an extended dynamic allocation (EDA) protocol when a reduced set of timeslots is being monitored and the timeslots being monitored vary over time.

For example, as illustrated in FIG. 11, the downlink channel 300 and uplink channel 302 implement EDA, while allowing monitored timeslots to vary over time. As illustrated, the UE 102 receives an initial uplink assignment for timeslots 2, 3 and 4. In this case, timeslot monitoring reduction is used with EDA enabled. In radio block period RBP1, the network 104 transmits a USF 358 via the downlink channel 300 to the UE 102 in timeslot number 2. If the UE 102 has data to send, it may send it in any or all of timeslots 2, 3, and 4 (indicated by elements 360, 362 and 364 on FIG. 11) in the next radio block period, RBP2. Thus, the network 104 reserves these timeslots for this UE 102 within uplink channel 302 (without knowing whether or not they will be used) and cannot allocate them to any other UE for this radio block period.

In the next radio block period, RBP3, the network 104 transmits a USF 366 for the UE 102 via the downlink channel 300 in timeslot number 3. If the UE 102 has data to send, it may send it in timeslots 3 and 4 (indicated by elements 368 and 370 on FIG. 11) in the next radio block period, RBP4. As such, the network reserves these two timeslots for this UE 102 on the uplink channel 302 (again it doesn't know if they will be used or not) and does not allocate them to any other UE for this radio block period.

In the next radio block period, RBP5, the network 104 transmits a USF 372 for the UE 102 via the downlink channel 300 in timeslot number 4. If the UE 102 has data to send, it may only send it in timeslot 4 (indicated by element 374 on FIG. 11) in the next radio block period, RBP6. Accordingly, the network reserves one timeslot in the uplink channel 302 for the UE 102. This case is the most efficient for network 104 and is the least efficient for the UE 102, if the UE 102 has multiple data blocks to send.

In the next radio block periods, this pattern repeats and the network 104 again transmits the USF for the UE 102 in timeslot number 2. The UE 102 and network 104 know the repeating pattern of where to send/monitor for the USF as it is either part of the defined timeslot reduction algorithm, explicitly signaled, or otherwise communicated between the UE 102 and network 104. For example, if the timeslot or timeslots being monitored for each USF changes in each radio block period (e.g., as described above), the network will also change its downlink slot according to the same algorithm so that the timeslots for data/uplink USF monitoring stay the same. In this example, the network 104 allocates resources by means of USFs sent in each of the radio block periods RBP1, RBP3, and RBP5; alternatively the network 104 may allocate resources in only a subset of radio block periods, taking into account, for example, the demand for uplink allocations from other mobile stations and/or the benefit of allowing the UE 102 to send multiple uplink radio blocks by means of a single USF. Note that the sending of any USFs are under control of network 104. In the example above the network 104 may choose not to signal one or more of USFs 358, 366, or 372.

Figure 12:
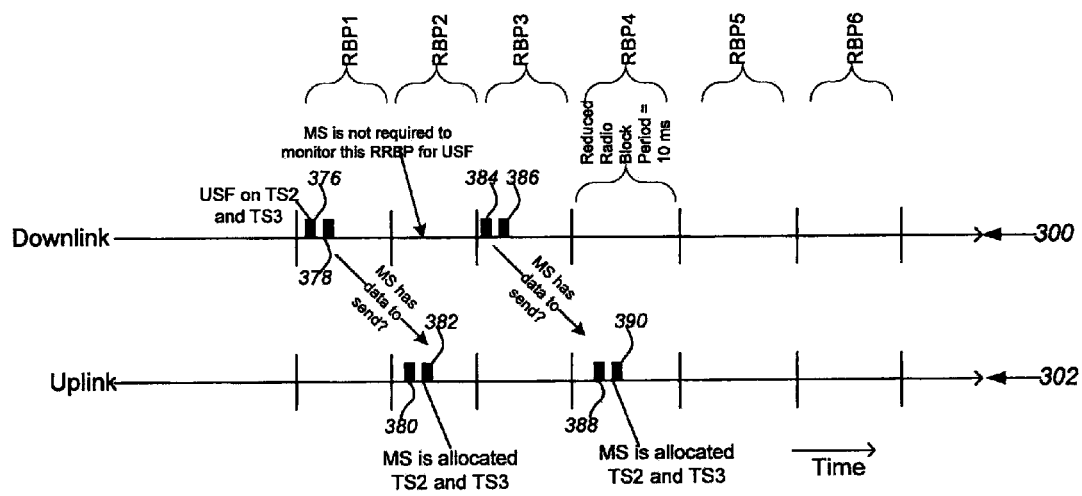
FIG. 12 illustrates an example of using a timeslot reduction algorithm with a reduced transmission time interval (RTTI) in the downlink and/or where RTTI USF mode is used to allocate uplink resources.

Turning now to FIG. 12, an implementation of the method steps 200 of FIG. 2 are illustrated, where RTTI is used in the downlink and/or where RTTI USF mode is used to allocate uplink resources where the timeslot reduction algorithm specifies not only on which timeslot numbers to monitor the downlink, but also in which radio block periods (for example, to monitor during only every other radio block period). This allows a further reduction in monitoring requirements below those required to detect one USF/downlink radio block per radio block period. As shown in FIG. 12, the network 104 sends via the downlink channel 300 a USF over 2 timeslots 376 and 378 in a reduced radio block period of 10 ms, indicated by RRBP1. In this case, timeslot reduction can be reduced to no fewer than 2 timeslots to support the USF; however, the UE 102 only needs to monitor every other reduced radio block period for the USF. If the UE 102 has data to send, it may transmit via the uplink channel 302 in timeslots 2 and 3, indicated by elements 380 and 382 in FIG. 12. The UE 102 is not required to monitor any timeslots in RRBP2. In the next reduced radio block period, RRBP3, a USF is sent via downlink channel 300 over 2 timeslots 384 and 386 in a reduced radio block period of 10 ms, indicated by RRBP3. In this case, timeslot monitoring can be reduced to no fewer than 2 timeslots to support the USF; however, the UE 102 only needs to monitor every other reduced radio block period for the USF. If the UE 102 has data to send, it may transmit via uplink channel 302 in timeslots 2 and 3 in the next reduced radio block period, indicated by elements 388 and 390. In one implementation, downlink channel 300 uses the same timeslots for data transmission as are monitored by the UE 102 for uplink USFs. In this example the network 104 allocates resources in each of the radio block periods during which the UE 102 monitors downlink timeslots; alternatively the network may allocate resources in only a subset of such radio block periods. Note that the sending of any USFs are under control of network 104. In the example above the network 104 may choose not to signal one or more of USFs sent on timeslots 376, 378, 384, and 386.

Figure 13:
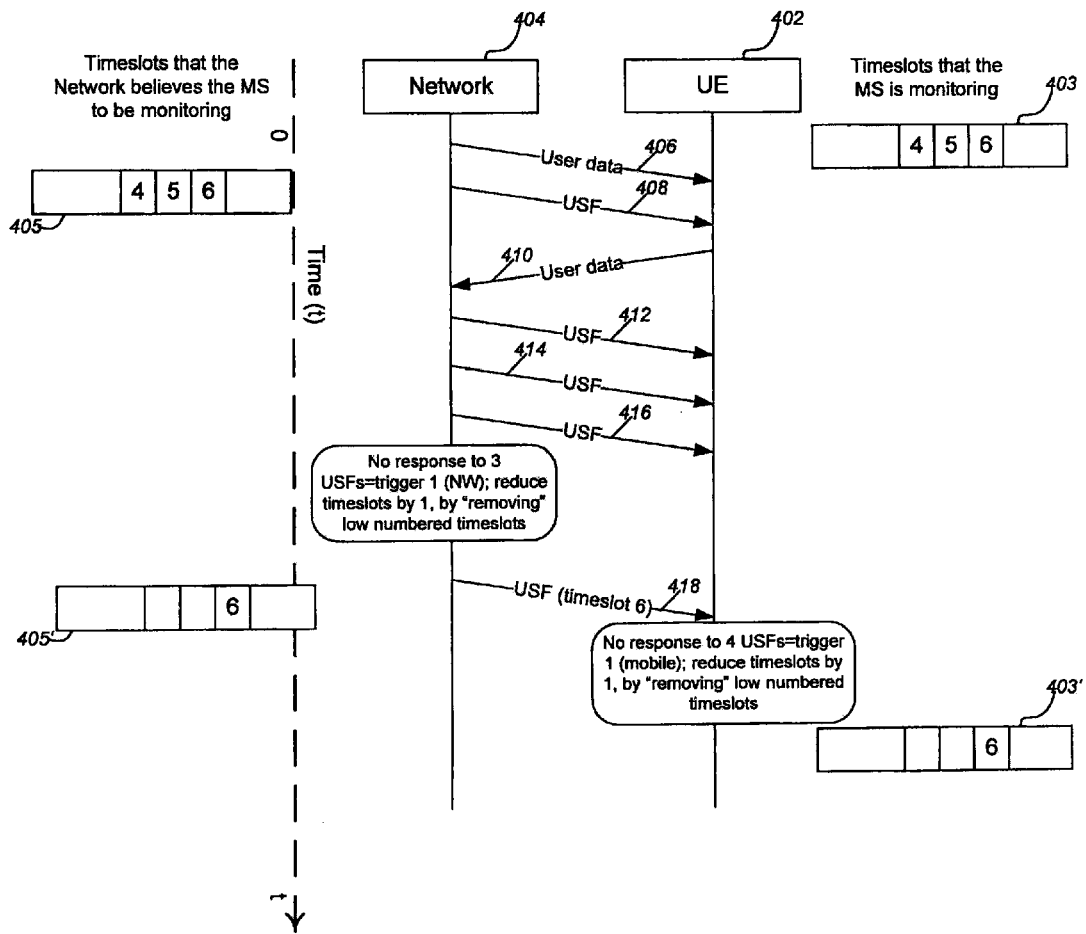
FIG. 13 is a sequence diagram illustrating an implementation of the present disclosure having a single trigger, wherein the trigger rules vary between a network and a UE.

FIG. 13 illustrates one example data flow sequence between a UE 402 and a network 404 when carrying out the steps of method 200 of FIG. 2 where trigger rules vary between the network 404 and UE 402. The first usage metric for raising a trigger applies to the network 404. In particular, when the UE 402 has not responded to three consecutive USFs, the timeslots which the network 104 considers to be being monitored by the UE 102 are to be reduced to 1 by removing low-numbered timeslots. The second usage metric for raising a trigger applies to the UE 402. In particular, when UE 402 has not responded to 4 USFs, the UE 402 reduces the monitored timeslots to 1 by removing low-numbered timeslots. In this implementation of the trigger algorithms, there is only a single trigger, as no further reduction of monitored timeslots can occur. Also, it is assumed that timeslot 6 is part of both the uplink and downlink assignments.

As illustrated in FIG. 13, at time t=0, the UE 402 is monitoring timeslots 4, 5, and 6 and this monitoring configuration is also known to the network 104 (see boxes 403, and 405, respectively). As the network 404 and UE 402 operate they communicate data back and forth. As shown on FIG. 13, the network 404 transmits user data 406 and then a USF 408 to the UE 402. After receiving the USF 408, the UE 402 transmits user data 410 to the network 404. At this point, the UE 402 is monitoring timeslots 4, 5, and 6. The network 404 then transmits USFs 412, 414, and 416 to the UE 402, with no responsive data being communicated from the UE 402 to network 404. After receiving no response to USFs 412, 414, and 416, the network 404 detects that a trigger event has occurred (i.e., three successive USFs, with no response from the UE 402) and reduces the set of timeslots which it expects the UE 402 to be monitoring in accordance with the trigger. With reference to FIG. 13, at this point the network 404 expects the UE 402 to monitors only timeslot 6 (see box 405'). The network 404 again issues a USF 418, but only via timeslot 6. At this point, the UE 402 is monitoring timeslots 4, 5, and 6 and receives the USF 428. After receiving USFs 412, 414, 416, and 418, however, and having no responsive data, the UE 402 determines that its own trigger event has occurred (4 successive USFs) and begins monitoring only timeslot 6 (see box 403').

Figure 14:
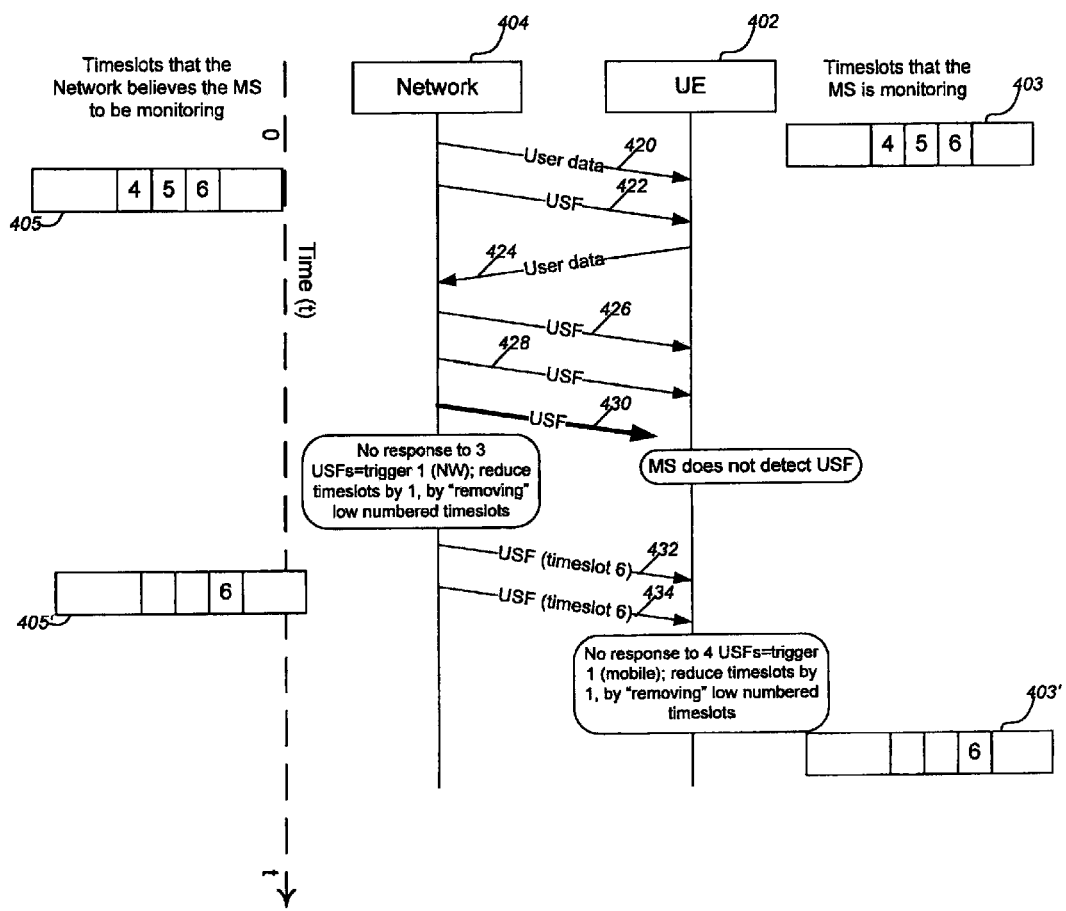
FIG. 14 is a sequence diagram illustrating an implementation of the present disclosure showing that the timeslots that the network believes the UE to be monitoring are a subset of those that the UE is actually monitoring.

FIG. 14 illustrates another example data flow sequence between the UE 402 and network 404 when carrying out the steps of method 200 of FIG. 2, when there is a lack of synchronization of triggers (in this case caused by the UE 402 not detecting a USF). As will be described, unlike traditional systems and methods that rely heavily on tight coordination and synchronization between the UE and network, the present disclosure is able to readily handle such a lack of synchronization between the UE 402 and network 404. In one configuration, a lack of synchronization does not generate difficulties because the timeslots that the network 404 believes the UE 402 to be monitoring are a subset of those that the UE is actually monitoring. As shown in FIG. 14, the network 404 transmits user data 420 and then a USF 422 to the UE 402. After receiving the USF 422, the UE 402 transmits user data 424 to the network 404. At this point, the UE 402 is monitoring timeslots 4, 5, and 6 and the network 404 expects the UE 402 to be monitoring timeslots 4, 5, and 6 (see boxes 403 and 405, respectively). The network 404 then transmits USFs 426, 428, and 430 to the UE 402, with no responsive data being communicated from the UE 402 to the network 404. After receiving no response to USFs 426, 428, and 430, the network 404 detects that a trigger event has occurred (three successive USFs with no response from UE 402) and reduces the set of timeslots it believes the UE 402 to be monitoring in accordance with the trigger. At this point, the network 404 expects the UE 402 to only monitor timeslot 6 (see box 405'). In this example, however, the UE 402 did not receive USF 430, and, as a result, only counts two unused USFs transmitted by network 404. After reducing the timeslots the network 404 believes the UE 402 to be monitoring, the network 404 transmits USFs 432 and 434, but only via timeslot 6. At this point, the UE 402 is still monitoring timeslots 4, 5, and 6 (it did not detect USF 430), so still receives USFs 432 and 434. However, after receiving USFs 426, 428, 432, and 434 (the UE 402 did not detect or otherwise receive USF 430) and having no responsive data, the UE 402 determines that its own trigger event has occurred (4 successive unused USFs) and begins monitoring only timeslot 6 (see box 403').

Figure 15:
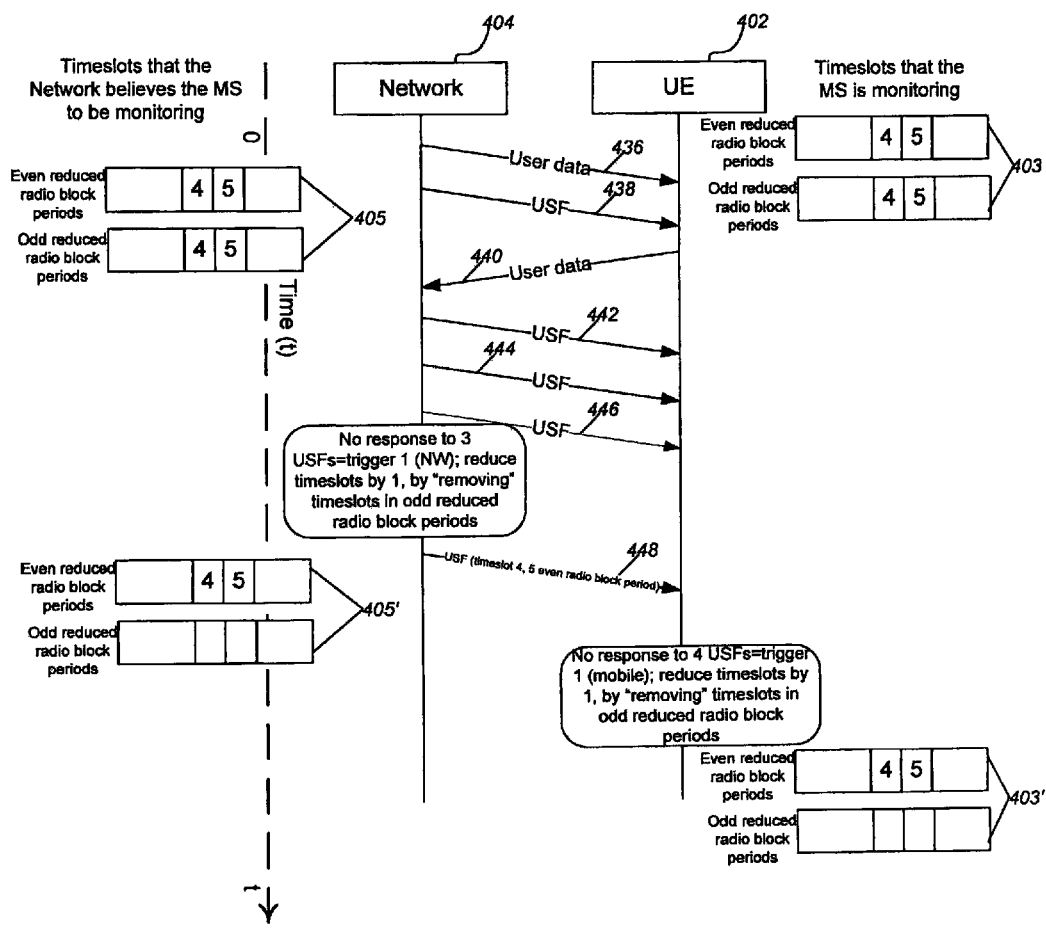
FIG. 15 is a sequence diagram illustrating an implementation of the present disclosure with an RTTI assignment.

FIG. 15 illustrates another example data flow sequence between a UE 402 and a network 404 when carrying out the steps of method 200 of FIG. 2 when operating in an RTTI configuration and where the reduction in timeslots distinguishes between odd and even radio block periods. The first usage metric for raising a trigger applies to the network 404 and states that when the UE 402 has not responded to 3 USFs, the network 404 will only expect the UE 402 to monitor timeslots in even RTTI radio block periods. The second usage metric for raising a trigger applies to the UE 402 and states that when the UE 402 has not responded to 4 USFs, the UE 402 will reduce monitored timeslots to an average of 1 per TDMA frame (counting only TDMA frames which can be used for data transfer) by only monitoring timeslots in even radio block periods. As illustrated in FIG. 15, at time t=0, the UE 402 is monitoring timeslots 4, and 5 in both even and odd radio block periods and the network 404 expects the UE 402 to be monitoring timeslots 4, and 5 in both even and odd radio block periods (see boxes 405, and 403, respectively). As the network 404 and UE 402 operate, they communicate data back and forth. As shown on FIG. 15, the network 404 transmits user data 436 and then USF 438 to the UE 402. After receiving the USF 438, the UE 402 transmits user data 440 to the network 404. The network 404 then transmits USFs 442, 444, and 446 to the UE 402, with no responsive data being communicated from the UE 402 to the network 404. After receiving no response to USFs 442, 444, and 446, the network 404 detects that a trigger event has occurred (three successive USFs, with no response from UE 402) and stops expecting the UE 402 to monitor timeslots on odd radio block periods in accordance with the trigger. At this point, the network 404 expects the UE 402 to only monitor timeslots 4 and 5 during even radio block periods (see box 405'). The network 404 again issues a USF 448, but only via timeslots 4 and 5 during the even radio block periods. At this point, the UE 402 is monitoring timeslots 4 and 5 in both even and odd radio block periods, so still receives the USF 448. After receiving USFs 442, 444, 446, and 448, however, and having no responsive data, the UE 402 determines that its own trigger event has occurred (4 successive USFs with no responsive data) and begins monitoring timeslot 4 and 5 only in even radio block periods (see box 403').

The present system and method allows for USFs to be robustly encoded. As a result, a lack of response (or a response consisting of dummy blocks) is robust to detect. Using method 200, additional signaling is reduced (although additional optional messages may be included to modify or define assignments, to enable or disable particular features, to indicate subset of timeslots to be applied, or to indicate trigger parameters or specifications). The steps of the method 200 described with respect to FIG. 2 may be implemented by the UE which has awareness of application-level status improving the accuracy over a method whereby the network or BSC estimates future data transmissions.

Referring again to FIG. 1, having provided for the reduction of timeslot monitoring to improve an efficiency of communications between the UE 102 and network 104, the present disclosure allows for the inverse process—an increase in timeslot monitoring. An increase in timeslot monitoring allows the UE 102 and network 104 to resume improved network performance during active data communication. The system may increase the number of monitored timeslots in response to particular user data transmitted by either the UE 102 or network 104, or any other message transmitted by either the network 104 or UE 102. Both the UE 102 and network 104 may increase the number of timeslot monitoring in a reverse application of the timeslot reduction algorithm defined above. For example, in a downlink dual carrier assignment, data sent on one channel may result in all timeslots on only that channel being monitored, or may result in all timeslots (on both channels) being monitored. Alternatively, upon receiving a predetermined transmission indicating a resumption of timeslot monitoring, both the UE 102 and network 104 may simply resume the monitoring of all assigned timeslots. In other implementations, other algorithms may be applied to determine the speed and progression with which both the UE 102 and network 104 resume monitoring particular assigned timeslots.

The indication to resume monitoring of particular assigned timeslots may be made by the UE 102 responding to a USF when timeslot reduction is active either by means of an existing dummy block format, or by means of another specified block format. This allows the UE 102 to increase timeslot monitoring by the network 104 if the UE 102 does not currently have data to send, but is aware or expects that it will imminently have data to send or receive. By allowing the UE 102 to increase timeslot monitoring, a higher bandwidth transmission of data between the UE 102 and network 104 can start sooner, and with improved bandwidth. As will be appreciated by one of skill in the art, the UE 102 may use the same or substantially similar process to that of increasing timeslot monitoring to delay decreased timeslot monitoring. That is, for example, the UE 102 may monitor expected or anticipated communications with the network 104 and, upon identifying a trigger for the UE 102 and/or the network 104 that would cause a reduction in timeslot monitoring, may communicate a dummy block or other specified block format to delay the impending reduction in timeslot monitoring. Once again, this is an illustration of a break from traditional paradigms where the network 104 dictates to the UE 102.

In one implementation, the UE 102 increases the number of timeslots it monitors within a timeframe that is shorter than that for reacting to new assignment messages. A maximum value for this shorter reaction time is known to both the network 104 and UE 102, so that the network 104 knows when the UE 102 is monitoring an increased set of timeslots. For example, an increase in the number of monitored timeslots (which may be up to the full assignment of timeslots as used before the initiation of the timeslot reduction algorithm) may occur within a predetermined number of radio block periods after certain information or data blocks, or other transmissions have been sent or received in either direction (or in the specific direction, if the algorithm is operated independently in each direction) between the UE 102 and network 104. The information may be any combination of user data, control messages, polls for control information, or specific contents thereof and may be known to both the UE 102 and network 104. It is not necessary that the information be signaled during application of the algorithm. In one implementation, however, the predetermined information to initiate an increase in monitored timeslots is signaled as part of an assignment message sent to the UE 102.

If the network 104 is transmitting data to UE 102, the data may be acknowledged before the complete full assignment is used. In that case, however, the network 104 may preemptively transmit on the full assignment of timeslots before an acknowledgement has been received. Alternatively, it may be sufficient that the UE 102 or network 104 detects the data and can decode it sufficiently to identify that user data has been sent (compared with dummy blocks, for example, if these are to be transmitted by the UE in response to USFs)—it may not be required that the receiver is able to decode the entire data correctly.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

We claim:

1. A method for coordinating communications between a user equipment and a base station, comprising:
   receiving an assignment of a first set of timeslots for at least one of uplink and downlink communications between the user equipment and the base station;
   monitoring the first set of timeslots identified for at least one of uplink communications and downlink communications;
   determining, at the user equipment, a usage metric defining a threshold for a communication activity between the user equipment and the base station;
   tracking, at the user equipment, usage of the first set of timeslots identified for at least one of uplink communications and downlink communications;
   detecting, at the user equipment, that the communication activity between the user equipment and the base station has not met the threshold;
   detecting, at the user equipment, a user-initiated action likely to generate network activity, the user-initiated action including at least one of entering content of an email message and entering content into a web-based form; and
   after detecting, at the user equipment, that the communication activity between the user equipment and the base station has not met the threshold and detecting, at the user equipment, the user-initiated action likely to generate network activity:
      transmitting to the base station an instruction to delay a reduction of a number of timeslots monitored by the user equipment to less than the first set of timeslots for communications that would otherwise result from the communication activity reaching the threshold.

2. The method of claim 1, wherein the instruction comprises at least one of a predetermined communication and a block including at least one of a dummy block format and a specified block format.

3. The method of claim 1, wherein the instruction comprises a packet uplink dummy control block.

4. The method of claim 1, including transmitting a control block to the base station, the control block identifying one or more timeslots being monitored by the user equipment.

5. The method of claim 1, wherein receiving an assignment of a first set of timeslots includes receiving an assignment message from the base station.

6. The method of claim 1, including transmitting the instruction to the base station after at least one of uplink communications and downlink communications reaches a usage metric.

7. The method of claim 6, wherein the usage metric is received at least one of in an assignment message and via packet data protocol (PDP) context establishment procedures.

8. A user equipment for use with a communications network including a base station, comprising:
   a processor configured to:
      receive an assignment of a first set of timeslots for at least one of uplink and downlink communications between the user equipment and the base station;
      monitor the first set of timeslots for communications; and
      determine, at the user equipment, a usage metric defining a threshold for a communication activity between the user equipment and the base station;
      detect, at the user equipment, that the communication activity between the user equipment and the base station has not met the threshold;
      detect, at the user equipment, a user-initiated action likely to generate network activity; and
      after detecting, at the user equipment, that the communication activity between the user equipment and the base station has not met the threshold and detecting, at the user equipment, the user-initiated action likely to generate network activity:
         transmit to the base station an instruction to delay a reduction of a number of timeslots monitored by the user equipment to less than the first set of timeslots for communications that would otherwise result from the communication activity having reached the threshold.

* * * * *